US 6,526,492 B1

(12) United States Patent
McBrearty et al.

(10) Patent No.: US 6,526,492 B1
(45) Date of Patent: Feb. 25, 2003

(54) METHOD OF ALLOWING A VOLUME MANAGER TO RELEASE AND REGAIN RESERVE

(75) Inventors: Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/107,104

(22) Filed: Jun. 30, 1998

(51) Int. Cl.$^7$ ............................................... G06F 12/00
(52) U.S. Cl. ........................................ 711/170; 711/111
(58) Field of Search ............................... 711/4, 111, 170

(56) References Cited

U.S. PATENT DOCUMENTS

| | | | | |
|---|---|---|---|---|
| 5,559,979 A | * | 9/1996 | Shiga et al. | 711/218 |
| 5,742,792 A | * | 4/1998 | Yanai et al. | 711/162 |
| 5,897,661 A | * | 4/1999 | Baranovsky et al. | 711/170 |
| 5,901,327 A | * | 5/1999 | Ofek | 711/100 |
| 6,044,444 A | * | 3/2000 | Ofek | 711/162 |

* cited by examiner

*Primary Examiner*—Jack A. Lane
(74) *Attorney, Agent, or Firm*—Volel Emile; Bracewell & Patterson, L.L.P.

(57) ABSTRACT

In a multiple machine data processing system, a volume group may be accessed by other than the original owner of the volume group and maintain integrity of the volume group. A logical volume manager on the primary machine holds all incoming I/O requests to the logical volumes in the volume group and waits for all the I/O requests already sent down to the disks in the volume group. Once all the outstanding I/O requests to the disk have been completed, the disks in the volume group are closed and reopened without reserve. The logical volume manager on a secondary machine opens the disks in the volume group without taking a reserve to allow meta-data to be refreshed on the secondary machine. When the secondary machine is finished the disks are closed. The logical volume manager on the primary machine holds all incoming I/O requests to the logical volumes in the volume group and waits for all the I/O requests already sent down to the disks in the volume group. Once all the outstanding I/O requests to the disks have been completed, the disks in the volume group are closed and reopened with reserve. The application on the primary machine does not see any of the operations and is unaffected.

8 Claims, 3 Drawing Sheets

METHOD OF ALLOWING A VOLUME MANAGER TO RELEASE AND REGAIN RESERVE

BACKGROUND OF THE INVENTION

1. Technical Field

The present invention relates in general to data processing systems and in particular to disk storage management in data processing systems. Still more particularly, the present invention relates to volume group management of reserves in disk storage systems.

2. Description of the Related Art

Availability of a data processing system has become a significant issue for many companies. Computerized applications have become more critical to operations and the need for reliability of the system has never been greater. Data processing systems have a direct effect on revenue, staff productivity, service level and costs associated with alternatives to the data processing system in case of failure.

Continuous availability is the highest level of availability. The data processing system never fails to deliver its service and attempt to provide 100% availability to the end user by providing.redundancy in components and the ability to change processes on-line. Planned outages may occur and a machine within the data processing system may fail, but they should not be apparent to the end user.

A data processing system using a UNIX operating system, may utilize a logical volume management system to manage access to storage devices, in particular disk drives. The logical volume management application ("LVM") is part of the kernel in the operating system and starts up when the system does. The objective of a LVM is to manage storage media as opposed to management of the storage device. A LVM uses a hierarchy of structures to manage fixed disk storage. Each individual fixed-disk drive, called a physical volume ("PV") has a name, such as /dev/hdisk0. Every PV in use belongs to a volume group ("VG"). All of the physical volumes (hard disk drives) in a volume group are divided into physical partitions ("PP") of the same size. The number of physical partitions on each disk varies, depending on the total capacity of the disk drive.

Within each volume group, one or more logical volumes are defined. Logical volumes ("LV") are groups of information located on physical volumes. Data on logical volumes appears to be contiguous to the user but may be non-contiguous on the physical volume. This allows file systems, paging space and other data logical volumes to be re-sized or relocated. Additionally, the logical volumes may span multiple physical volumes, and have their contents replicated for greater flexibility and availability in the storage of data.

Each logical volume consists of one or more logical partitions ("LP"). Each LP corresponds to at least one physical partition. Of all the components used in a computer system, physical disk drives are usually the most susceptible to failure. Because of this, mirroring is a frequently used technique for increasing system availability. A filesystem can easily be mirrored when using the Logical Volume manager by mirroring the logical volume on which the filesystem is created. If mirroring is specified for the logical volume, additional physical partitions are allocated to store the additional copies of each logical partition. Although the logical partitions are numbered consecutively, the underlying physical partitions are not necessarily consecutive or contiguous. Logical volumes may serve a number of system purposes such as paging, storing raw data or holding a single filesystem.

For LVs having mirrored copies each partition of the mirror can have two states; available and stale. Data may be read from any available mirrored partition. Data must be written to all available mirrored partitions before returning. Only partitions that are marked as available will be read and written. A command must be run that will copy information from an available mirror to the stale mirror and then changes a partition marked as stale to available.

Character Input/Output ("I/O") requests are performed by issuing a read or write request on a /dev/rlv[N] character special file for a logical volume. The read or write is processed by the file system Supervisor Call (SVC) handler which calls a logical volume device driver ("LVDD") ddread or ddwrite entry point. The LVDD is a pseudo-device driver that operates on logical volumes through a special file, such as /dev/lv[n]. Similar to a physical disk device driver, this pseudo-device driver provides character and block entry points with compatible arguments. Each volume has an entry in the kernel device switch table. Each entry contains entry points for the device driver and a pointer to the volume group data structure.

The read or write (expressed "ddread" and "ddwrite") entry point transforms the character request into a block request by building a buffer for the request and calling the LVDD ddstrategy entry point. Block I/O requests are performed by issuing a read or write on a block special file /dev/lv[n] for a logical volume. The LVDD ddstrategy entry point translates the logical address to a physical address and calls the appropriate physical disk device driver.

On completion of the I/O, the physical device driver calls the iodone kernel service on the device interrupt level. This service then calls the LVDD I/O completion-handling routine. The LVDD then calls the iodone service to notify the requester that the I/O is complete.

A single initiator system enables only one machine at a time to access the storage device. The system may have multiple machines on the same bus (in this instance a bus) that may access the storage device. The LVM sets up a reserve when the system boots up. The reserve blocks access to a specified volume in the storage device. The LVM protects the disks from improper access when the reserve is activated.

A system utilizing more than one machine has a designated primary machine and the rest are secondary. If a primary machine fails, secondary machine(s) activate and take over the data processing function of the primary machine. The reserves have to be made available to the secondary machines on a periodic basis to maintain currency so switching machines is not inordinately delayed in case of failure.

An example of a system having multiple machines sharing one storage source follows. A data processing system with two machines, node_A and node_B, on a bus is serially sharing a storage device. Node_A is up and has ownership of the volume group. This means that node_A has a reserve on the volume group and machine node_B is unable to access the reserve until node_A gives up its reserve. If node_A crashes (failover), node_B takes the volume group, starts it up (vary on) and, if node_B is current, begins processing the data so the application can continue.

If Meta-data in the volume group has changed while in reserve to node_A, node_B must export and re-import the volume group before beginning processing because the data has changed with respect to node_B's record of meta-data before being locked out by the LVM reserve. If there has been no scheduled failover to update node_B, the time to update can be extensive. Also, when node_A recovers and takes control of the volume group, node_A must determine the changes made while node_13 A was down—a repeat of the previously discussed process.

In FIG. 3, a flow diagram of a current method of volume management in multiple node, non-concurrent use storage devices, is depicted. The process begins in step 302 which depicts an occurrence causing the data processing (not shown) to change nodes. This could be a scheduled downtime or node_A could have failed. The process proceeds to step 304 which illustrates the logical volume manager shutting down the volume group owned by node_A. At this point, node_A is no longer accessing the logical volume and is prevented from doing so as shown in step 306, which depicts the logical volume manager locking node_A out of the volume group. The process next proceeds to step 308, which illustrates the logical volume manager opening a volume group on the back up machine, node_B. The process then passes to step 310, which depicts node_B, gaining access to the storage device and beginning to refresh its meta-data in its volume group.

The process next proceeds to step 312, which illustrates the completion of the refreshment of the meta-data of node_B and the logical volume manager closing the volume group to node_B. The process continues to step 314, which depicts the logical volume manager cycling node_A back up, re-opening the storage device and opening the volume group to node_A. The process next passes to step 316, which illustrates node_A refreshing its meta-data, which is out of date due to the downtime while node_B had the volume group.

An alternate method for maintaining currency is to eliminate the reserve and leave the storage device available at all times to all machines on the bus. No machines are locked out, so meta-data changes by the primary machine, node_A in this case, are available for all machines to access. However, the operator has a less secure position because any machine could lock the disks and access to the storage device and subsequently, data access is lost.

It would be desirable, therefore, to provide a method for allowing logical volume managers to give up or gain the reserve.without cycling the volume group and user application up and down, while maintaining security of the volume group.

SUMMARY OF THE INVENTION

It is therefore one object of the present invention to provide a process that will allow multi-initiator data processing systems to access meta-data that is reserved without deactivating the storage device.

It is another object of the present invention to provide a process that will allow multiple nodes access to a reserved volume group without shutting down the original owner of the volume group.

It is yet another object of the present invention to provide a data processing system, with primary and secondary nodes, a process that allows all the nodes to refresh each node's version of meta-data without shutting down the primary node.

The foregoing objects are achieved as is now described. In a multiple machine data processing system, a volume group may be accessed by other than the original owner of the volume group and maintain integrity of the volume group. A logical volume manager on the primary machine holds all incoming I/O requests to the logical volumes in the volume group and waits for all the I/O requests already sent down to the disks in the volume group. Once all the outstanding I/O requests to the disk have been completed, the disks in the volume group are closed and reopened without reserve. The logical volume manager on a secondary machine opens the disks in the volume group without taking a reserve to allow meta-data to be refreshed on the secondary machine. When the secondary machine is finished the disks are closed. The logical volume manager on the primary machine holds all incoming I/O requests to the logical volumes in the volume group and waits for all the I/O requests already sent down to the disks in the volume group. Once all the outstanding I/O requests to the disks have been completed, the disks in the volume group are closed and reopened with reserve. The application on the primary machine does not see any of the operations and is unaffected.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
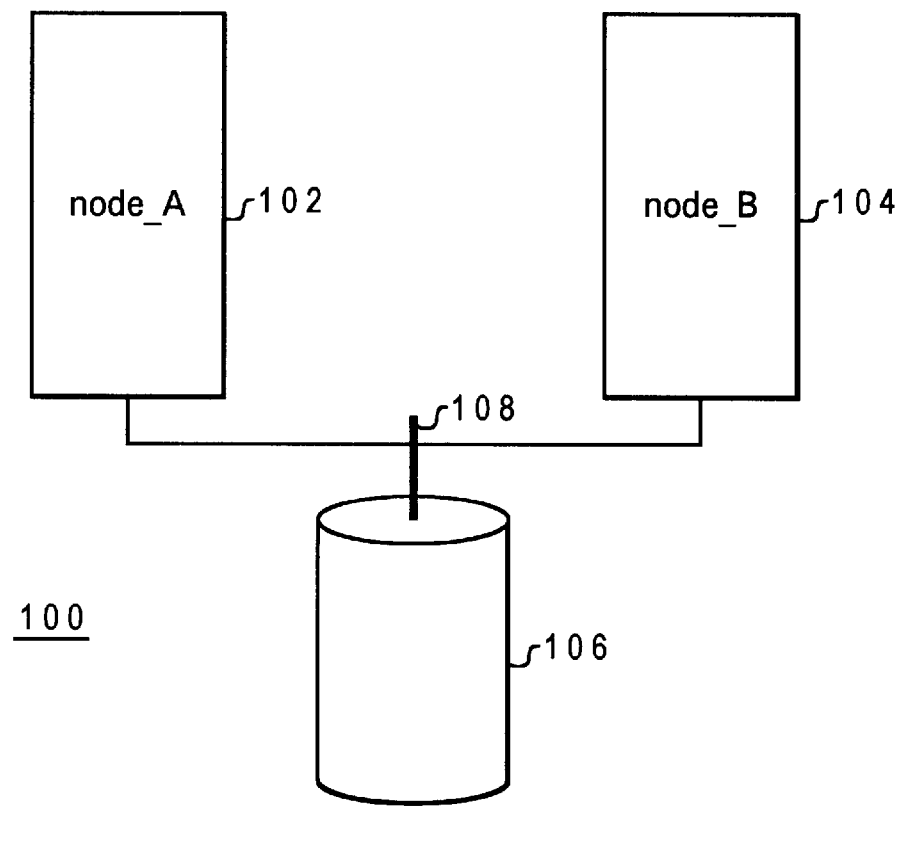
FIG. 1 depicts a data processing system having multiple nodes with non-concurrent access to a storage device in which a preferred embodiment of the present invention may be implemented.
Figure 1:
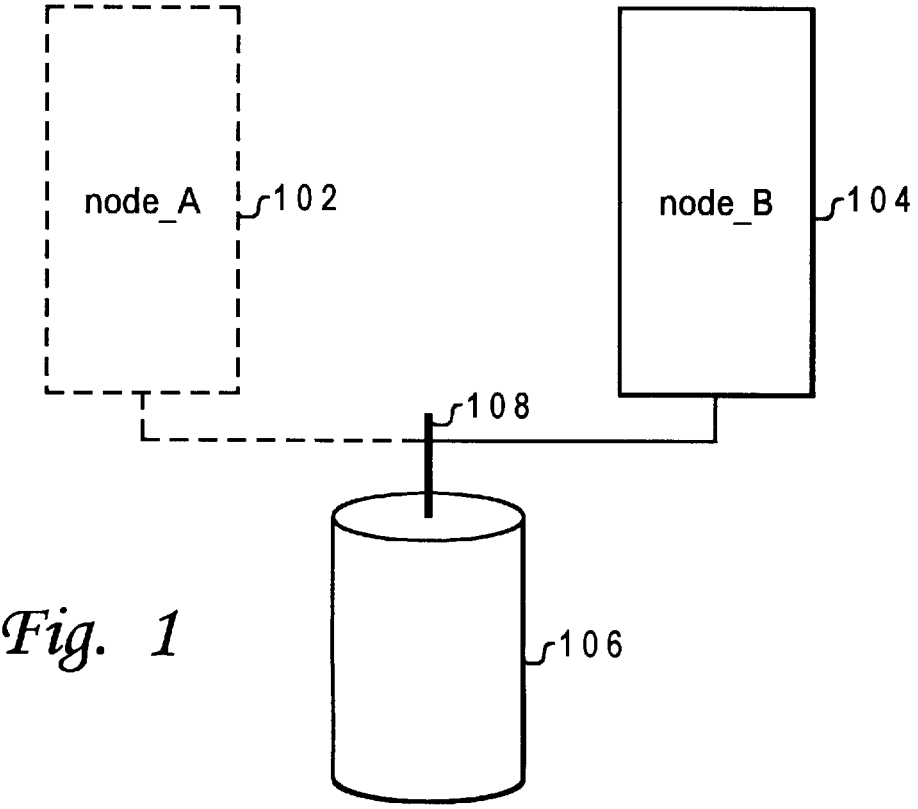

With reference now to the figures, and in particular with reference to FIG. 1, a data processing system having multiple nodes with non-concurrent access to a storage device in which a preferred embodiment of the present invention may be implemented, is depicted. Data processing system 100 is shown with two nodes, node_A 102 and node_B 104, in communication with storage device 106 through bus 108. The top view illustrates data processing system 100 in operational mode with node_A 102 as the primary machine connected to storage device 106. Node A 102 is physically connected to storage device 106 and is available to node_A 102. Logical volume manager (not shown) is installed locally.

Node B 104 is physically connected through bus 108, but storage device 106 is not necessarily available to node B 104. Logical volume manager (not shown) locks out node_B 104 since node_A 102 is the primary machine. However, the bottom view illustrates node_A 102 disabled due to failure or scheduled downtime. In this instance, node_B 104 is physically connected to storage device 106 via bus 108. Storage device 106 is available to node_B 104, now the primary machine, and node_A 102 is locked out. As the outage is corrected or finished in the case of scheduled downtime, the LVM reverses the procedure and re-opens the storage device 106 to node__A 102 after closing the storage device 106 to node__B 104.

Figure 2:
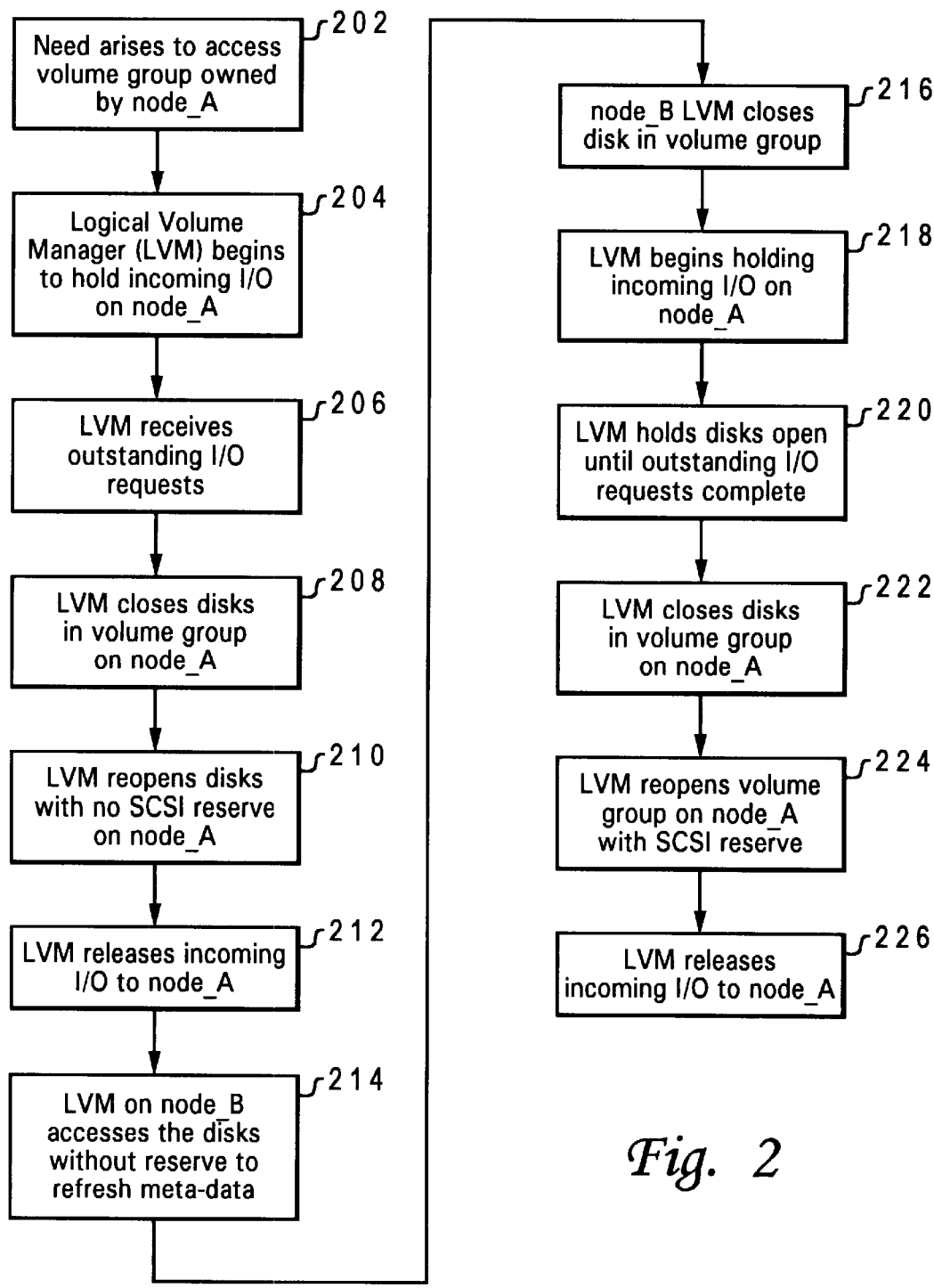
FIG. 2 is a flow diagram in accordance with a preferred embodiment of the present invention.
Figure 3:
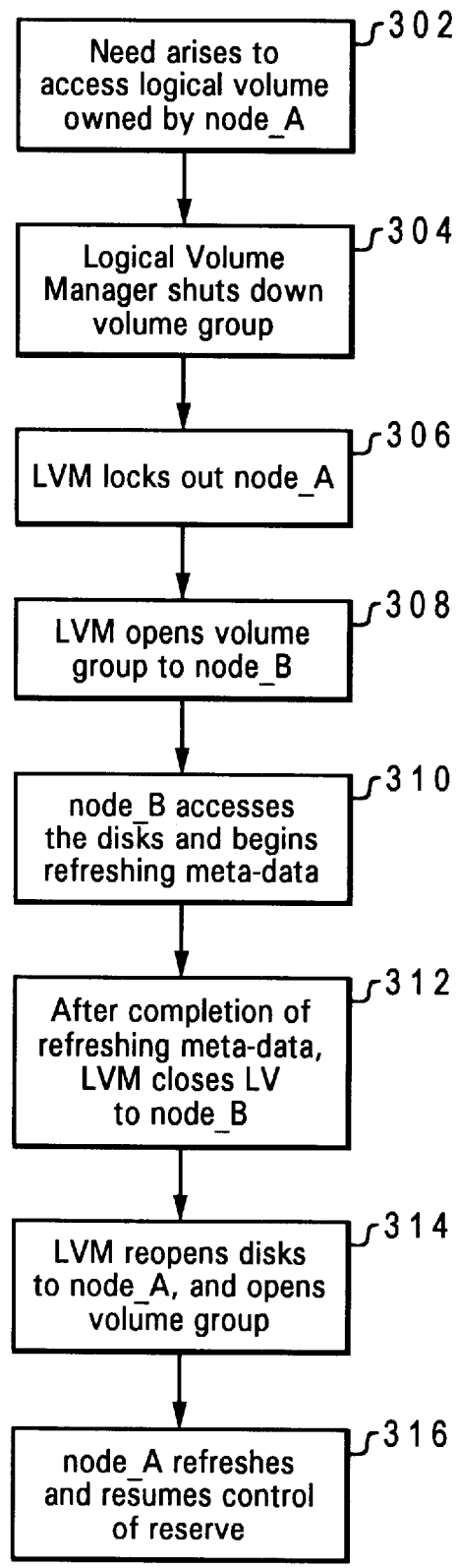
FIG. 3 depicts a flow diagram of a current method of volume management in multiple node, non-concurrent storage devices.

Turning now to FIG. 2, a flow diagram in accordance with a preferred embodiment of the present invention, is illustrated. The process begins with step 202, which depicts an occurrence (not shown) that causes the LVM to require an update to node__B's local meta-data for the volume group. The process proceeds to step 204, which illustrates the logical volume manager setting an indicator so that all new I/O requests to the logical volumes in the volume group are put in a holding queue for subsequent processing. The process next passes to step 206, which depicts the logical volume manager waiting for all I/O requests, previously sent to the disks in the volume group, to complete. The process then passes to step 208, which illustrates the logical volume manager closing the disks in the volume group on node__A. After the disk I/O requests are complete, the process proceeds to step 210, which depicts the logical volume manager reopening the disks without taking a reserve. Step 208 and step 210 allow node__A to operate as if there were no interruptions, by receiving all I/O requests and delaying the requests until the disks are reopened without the reserve.

The process next passes to step 212, which depicts the logical volume manager clearing the indicator so that new I/O requests to the logical volumes in the volume group are no longer held and any I/O requests that was being held is then allowed to continue. The process continues to step 214, which illustrates the logical volume manager on node__B accessing the disks without establishing a reserve and node__B begins refreshing the local meta-data for the volume group. The process then proceeds to step 216, which depicts node__B's logical volume manager closing the disks in the volume group after completing refreshing node__B's meta-data. At this point, node__A can re-establish the reserve. The process next passes to step 218, which illustrates the node__A logical volume manager setting an indicator so that all new I/O requests to the logical volumes in the volume group is held in a holding queue for subsequent processing.

The process continues to step 220, which depicts node__A logical volume manager holding the storage disks open until all the I/O requests, previously sent to the storage disks complete. The process then proceeds to step 222, which illustrates the logical volume manager closing the disks in the volume group. The process next passes to step 224, which depicts the logical volume manager re-opening the volume group and establishing the reserve. The process continues to step 226, which illustrates the logical volume manager clearing the indicator set in step 218. After the indicator is cleared, new I/O requests to the logical volumes in the volume group are no longer held and any I/O requests that were held are then allowed to continue.

In the non-concurrent mode, normally the system has to cycle down to allow the backup machine to take over the storage device. This process allows the backup, or secondary, machine to refresh its meta-data without cycling down the primary machine. An advantage is no downtime. The primary machine continues operating as if there were no switch-over and the secondary machine has current data at all times. If a failure occurs, the secondary machine does not have to take time to update its volume group and the change over is seamless, or invisible, to the user.

While the invention has been particularly shown and described with reference to a preferred embodiment, it will be understood by those skilled in the art that various changes in form and detail may be made therein without departing from the spirit and scope of the invention.

What is claimed is:

1. A method for managing a storage device utilized by multiple machines in a non-concurrent mode, comprising:
   controlling a reserve for a first machine in a volume group by:
      releasing the reserve for the first machine in the volume group;
      accessing the disks in the volume group by a second machine;
      re-establishing the reserve for the first machine in the volume group; and
   suspending input/output requests for the first machine while releasing the reserve, accessing the disks and re-establishing the reserve.

2. The method of claim 1, wherein controlling the reserve on a volume group for a first machine, further comprises:
   holding new input/output requests for the volume group on the first machine;
   finishing current input/output requests for the volume group on the first machine;
   closing the storage device and
   releasing the reserve on the volume group for the first machine;
   re-opening the storage device without the reserve on the first machine; and
   releasing retained input/output requests for the first machine.

3. The method of claim 1, wherein accessing the disks in the volume group by a second machine, further comprises:
   opening a volume group on the second machine without the reserve;
   determining the changes made in the volume group by the first machine;
   updating meta-data on the second machine; and
   closing the volume group on the second machine.

4. The method of claim 1, wherein reopening the reserve to the first machine, further comprises:
   holding new input/output requests for the volume group on the first machine;
   finishing current input/output requests for the volume group on the first machine;
   closing the storage device and
   re-establishing the reserve;
   re-opening the storage device and re-establishing the reserve on the first machine; and
   releasing retained input/output requests for the first machine.

5. A data processing system for managing a storage device utilized by multiple machines in a non-concurrent mode, comprising:
   a logical volume manager for controlling a reserve on disks in a volume group for a first machine, further comprising:
      release means for releasing the reserve for the first machines in the volume group;
      access means for accessing the disks in the volume group by a second machine; and
      re-establishment means for re-establishing the reserve for the first machine in the volume group; and
   a buffer for suspending input/output requests for the first machine while releasing the reserve, accessing the disks and re-establishing the reserve.

6. The data processing system of claim 5, wherein the buffer for holding input/output requests for the first machine, further comprises
 conclusion means for finishing current input/output requests for the first machine.

7. The data processing system of claim 5, wherein the logical volume manager for controlling a reserve on a volume group for a first machine, further comprises:
 an opening means for opening a volume group on the second machine;
 an update means for updating the local meta-data on the second machine with changes to the volume group on the first machine; and
 closure means for closing the volume group on the second machine.

8. The data processing system claim 7, further comprises:
 suspension means for suspending new input/output requests for the volume group on the first machine;
 finishing means for finishing current input/output requests for the volume group on the first machine;
 means for re-establishing the reserve on the first machine;
 means for closing the storage device and
 means for re-opening the reserve on the storage device to the first machine; and
 release means for releasing retained input/output requests for the first machine.

* * * * *

UNITED STATES PATENT AND TRADEMARK OFFICE
CERTIFICATE OF CORRECTION

PATENT NO.   : 6,526,492 B1
DATED        : February 25, 2003
INVENTOR(S)  : McBrearty et al.

It is certified that error appears in the above-identified patent and that said Letters Patent is hereby corrected as shown below:

<u>Column 3,</u>
Line 7, please replace "$node_{13}A$" with -- node_A --.

Signed and Sealed this

First Day of July, 2003

JAMES E. ROGAN
*Director of the United States Patent and Trademark Office*